United States Patent
Vliegen et al.

(10) Patent No.: US 12,013,896 B2
(45) Date of Patent: Jun. 18, 2024

(54) STABLE GRAPH LAYOUT DETERMINATION

(71) Applicant: MagnaView B.V., Eindhoven (NL)

(72) Inventors: Roeland Augustinus Maria Vliegen, Waalre (NL); Roeland Johannus Scheepens, Eindhoven (NL); Robin Johannes Pieter Mennens, Eindhoven (NL)

(73) Assignee: MagnaView B.V., Eindhoven (NL)

( * ) Notice: Subject to any disclaimer, the term of this patent is extended or adjusted under 35 U.S.C. 154(b) by 196 days.

(21) Appl. No.: 17/254,705

(22) PCT Filed: Jun. 7, 2019

(86) PCT No.: PCT/EP2019/064925
§ 371 (c)(1),
(2) Date: Dec. 21, 2020

(87) PCT Pub. No.: WO2020/001956
PCT Pub. Date: Jan. 20, 2020

(65) Prior Publication Data
US 2021/0326387 A1  Oct. 21, 2021

(30) Foreign Application Priority Data

Jun. 28, 2018  (EP) .................... 18180380

(51) Int. Cl.
*G06F 16/901*    (2019.01)
*G06F 16/904*    (2019.01)

(52) U.S. Cl.
CPC ........ *G06F 16/9024* (2019.01); *G06F 16/904* (2019.01)

(58) Field of Classification Search
CPC ... G06F 16/9024; G06F 16/904; G06T 11/206
See application file for complete search history.

(56) References Cited

U.S. PATENT DOCUMENTS

| | | | |
|---|---|---|---|
| 8,577,911 B1 * | 11/2013 | Stepinski | G06F 16/3328 707/765 |
| 2008/0246769 A1 * | 10/2008 | Milov | G06F 30/18 345/440 |

(Continued)

FOREIGN PATENT DOCUMENTS

| | | |
|---|---|---|
| JP | 2015075960 A | 4/2015 |
| JP | 2015203883 A | 11/2015 |
| WO | 2006091119 A1 | 8/2006 |

OTHER PUBLICATIONS

Tamassia, "Handbook of Graph Drawing and Visualization," 2013, Chapter 13: Hierarchical Drawing Algorithms, pp. 409-453.

(Continued)

*Primary Examiner* — Daniel W Parcher
(74) *Attorney, Agent, or Firm* — Chiesa Shahinian & Giantomasi PC

(57) ABSTRACT

Some embodiments are directed towards a graph layout device for determining a layout of a graph. The graph being induced by a set of paths through a set of nodes. The nodes of the graph are comprised in the set of nodes. The set of paths is a subset of a global set of paths through the set of nodes. The layout comprises a position of each node of the graph. The graph layout device computes a global rank assignment, filters the global set of paths to obtain the set of paths, and computes the layout of the graph based on the global rank assignment.

16 Claims, 9 Drawing Sheets

(56) References Cited

U.S. PATENT DOCUMENTS

| | | | |
|---|---|---|---|
| 2011/0025692 A1* | 2/2011 | Pasquali | G06Q 10/047 |
| | | | 345/440 |
| 2013/0268533 A1* | 10/2013 | Komarov | G06F 16/2228 |
| | | | 707/740 |
| 2014/0129420 A1* | 5/2014 | Howe | G06Q 50/01 |
| | | | 705/38 |
| 2014/0214936 A1* | 7/2014 | Abraham | H04W 4/21 |
| | | | 709/204 |
| 2014/0337306 A1* | 11/2014 | Gramatica | G06F 16/2471 |
| | | | 707/706 |
| 2015/0294488 A1 | 10/2015 | Iwasaki et al. | |

OTHER PUBLICATIONS

Graphviz—Graph Visualization Software, retrieved online on Jun. 28, 2018, from https://www.graphviz.org/, 3 pgs.

Gansner et al., "A Technique for Drawing Directed Graphs," 1993, IEEE Transactions on Software Engineering, vol. 19, Issue 3, pp. 214-230.

International Search Report and Written Opinion dated Aug. 13, 2019, in connection with International Patent Application No. PCT/EP2019/064925, filed Jun. 7, 2019, 11 pgs.

Raitner, "Visual Navigation of Compound Graphs," 2005, Pach J. (eds) Graph Drawing. GD 2004. Lecture Notes in Computer Science, vol. 3383, pp. 403-413.

Decision to Grant dated Sep. 29, 2023 in connection with Japanese Patent Application No. 2020-571599, filed Dec. 17, 2020, 5 pgs. (including translation).

\* cited by examiner

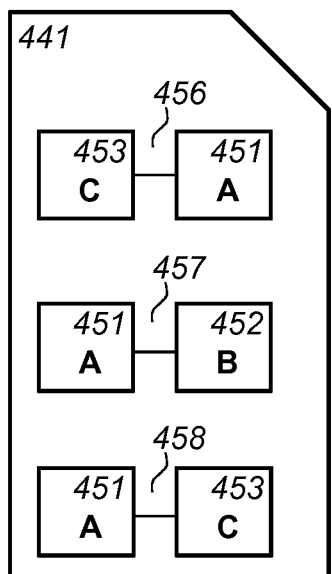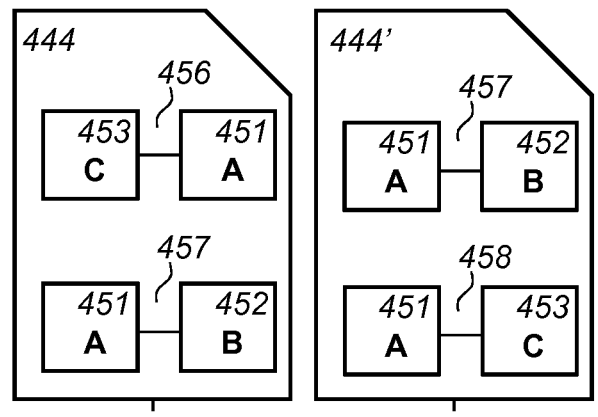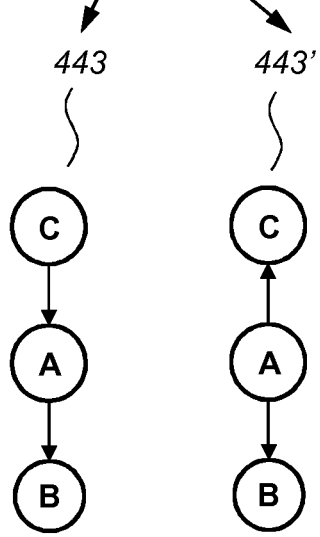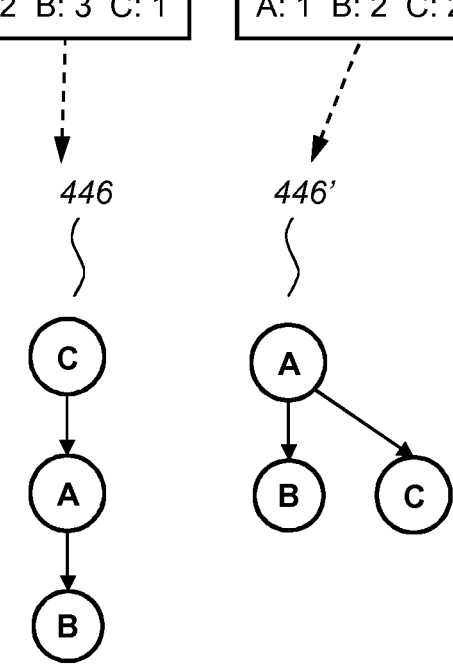
Fig. 4a         Fig. 4b

STABLE GRAPH LAYOUT DETERMINATION

CROSS-REFERENCE TO RELATED APPLICATIONS

This application is a national stage under 35 U.S.C. 371 of International Patent Application No. PCT/EP2019/064925, filed Jun. 7, 2019, which claims priority to European Patent Application No. 18180380.0, filed Jun. 28, 2018, the disclosures of which are incorporated herein by reference in their entirety.

FIELD OF THE INVENTION

The invention relates to a graph layout device, a graph layout method, and a computer readable medium.

BACKGROUND

Various relations and processes, for example, in physical, biological, social and information systems, may be represented as graphs comprising nodes and edges. For example, in a biological system, a node may represent an area where a certain species exists and an edge may represent a migration path between the regions. A type of graph that is particularly useful to gain insight from data are graphs that are induced by a set of paths, e.g., sequences of nodes of the graph. For example, in an information system, a path may represent a temporal sequence of related logged activities (e.g., "login" and "logout"). Such sets of paths may induce a graph comprising their nodes and connections between these nodes. This graph is useful to gain insight into which nodes frequently occur together in a path, e.g., which logged activities are often subsequently performed.

It is beneficial to provide visualizations of graphs to users, e.g., to be used to gain a better understanding of the data it represents. The technical area of graph drawing concerns determining layouts, e.g., pictorial representations, of the vertices and edges of a graph. Graph drawing is complex: many layouts of the same graph are possible, and algorithms for determining layout have to balance various factors such as performance, size of the resulting graph, and various aesthetic parameters such as the number of edge crossings, the length of edges and the spatial distribution of nodes.

A class of graph drawing techniques known in the state of the art focuses on hierarchical graph drawing, also known as layered graph drawing or Sugiyama-style graph drawing, as discussed in "Handbook of Graph Drawing and Visualization" by Roberto Tamassia (editor), chapter 13, "Hierarchical Drawing Algorithms". Hierarchical graph drawing typically at least involves a cycle removal step in which the graph is made acyclic; a layer assignment step in which nodes are divided into layers or ranks; a vertex ordering step in which vertices with the same rank are ordered; and an x-coordinate assignment step in which an exact positioning of nodes is determined. Several of these steps involve solving complex optimization problems for which it is often necessary to resort to heuristics. Various ways of performing the steps may be used, for example, as detailed in the "Handbook of Graph Drawing and Visualization". An implementation of hierarchical graph drawing is available, for example, in the "dot" tool which is part of the Graphviz graph visualization software package.

A disadvantage of the use of existing layered graph drawing approaches to determine layouts of graphs is that their results are dissatisfactory from a stability point of view. Stability of graph layouts relates to minimizing the difference in the placement of nodes and edges when changes are made to the graph, e.g., different layouts should preserve directions of edges, relative distances between nodes, and/or positions of nodes in the layout, in particular, while also taking into account paths that induce the graph. For example, in a system for interactive analysis of datasets, e.g., by performing various filterings, e.g., of paths, and inspecting resulting graphs, stability between the various resulting graphs is desirable, e.g., to make it easier for the user to observe the changes. However, stability is typically not guaranteed by existing layered graph drawing approaches, for example, the addition or removal of a single edge may result in a completely different layout of the graph, making it hard to see what has changed.

It is therefore desirable to provide a graph layout method for path-induced graphs with improved stability.

SUMMARY OF THE INVENTION

A graph layout device as defined in the claims is proposed. The graph layout device determines a layout of a graph. The graph is induced by a set of paths through a set of nodes. The nodes of the graph are comprised in the set of nodes, and the set of paths is a subset of a global set of paths through the set of nodes. The layout comprises a position of each node of the graph. The graph layout device computes a global rank assignment assigning a rank to each node in the set of nodes. Computing the global rank assignment comprises iteratively selecting a path from the global set of paths and updating the global rank assignment based on the selected path. The graph layout device filters the global set of paths to obtain the set of paths. The graph layout device computes the layout of the graph based on the global rank assignment, wherein nodes of the graph with equal rank assignments are positioned adjacent to each other and stores the layout of the graph in the memory.

Interestingly, by using the global set of paths to compute the global rank assignment and using the global rank assignment to compute the layout of the graph, stability is improved since different graphs relating to the same global set of nodes may re-use the same global rank assignment; moreover, computing the global rank assignment in this way and/or re-using it may provide performance advantages and/or may result in a graph that more closely matches the underlying data.

In an embodiment, the graph layout device determines a layout of a further graph induced by a further set of paths through the set of nodes based on the same global rank assignment, thus improving stability between the graph and the further graph. In an embodiment, the graph layout device renders the graph on a display. In a further embodiment, the graph layout device renders an animation morphing a rendering of the graph into a rendering of a further graph, the rendering being facilitated by the improved stability.

In an embodiment, computing the layout of the graph comprises determining a set of nodes with equal rank assignments, determining an ordering of said set of nodes, and assigning a position to a node in said set of nodes according to the global rank assignment and said ordering. In an embodiment, nodes with equal rank assignments are ordered according to an ordering of a global graph, thereby further improving stability and performance. In an embodiment, nodes are ordered making use of a backbone node, resulting in a graph that more closely matches the underlying data, especially its sequential nature.

In an embodiment, paths from the global set of paths have weights determining the order in which the global rank assignment is determined. This may result in a graph layout that more closely matches the underlying data, e.g., a graph layout that more prominently shows paths with high weight. In an embodiment, a weight represents a number of occurrences. In an embodiment, the weight of a path is specified by a user. In an embodiment, nodes represent activities and paths represent temporal sequences of activities.

A further aspect of the invention is a graph layout method as defined in the claims. A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIGS. 1a, 1b schematically show examples of embodiments of a graph layout device, FIG. 2 schematically shows an example of an embodiment of a graph layout device, FIGS. 3a, 3b, 3c schematically show examples of embodiments of a ranking unit, FIG. 3d schematically shows an example of a graph rendered according to a layout of a graph, FIG. 4a schematically shows an example of a global rank assignment resulting in layouts of two graphs, FIG. 4b schematically shows an example of a local rank assignment resulting in layouts of two graphs.

Figure 1A:
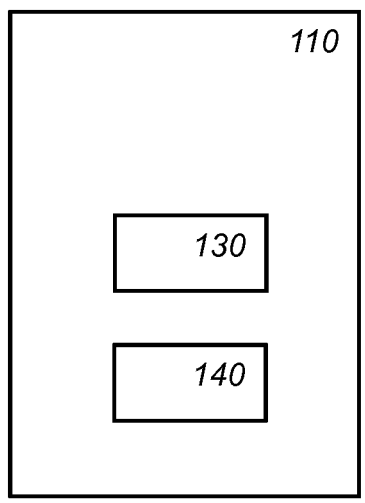

LIST OF REFERENCE NUMERALS 110, 111 a graph layout device
121 a display
130, 131 a processor
140, 141 a memory
210 a graph layout device
220 a display
231 a ranking unit
232 a filtering unit
233 a layout unit
234 a rendering unit
241 a global set of paths
242 a global rank assignment
243 a set of paths
244 a layout of a graph
251, 252, 253, 254, 255 a node
256, 257, 258 a path
331 a ranking unit
342, 342', 342" a global rank assignment
351, 352, 353, 354, 355 a node
356, 357, 358 a selected path
441 a global set of paths
442 a global rank assignment
443, 443' a layout of a graph based on the global rank assignment
444, 444' a set of paths
445, 445' a local rank assignment
446, 446' a layout of a graph based on a local rank assignment
451, 452, 453 a node
456, 457, 458 a path
500, 510, 600, 700 a rendered graph
501-505, 511-515, 601-605, 701-705 a node
509, 609 an edge
900 a graph layout method
901 computing a global rank assignment
902 filtering the global set of paths
903 computing the layout of the graph
904 storing the layout of the graph
911 selecting a path
912 checking whether the global rank assignment is complete
913 updating the global rank assignment
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 1B:
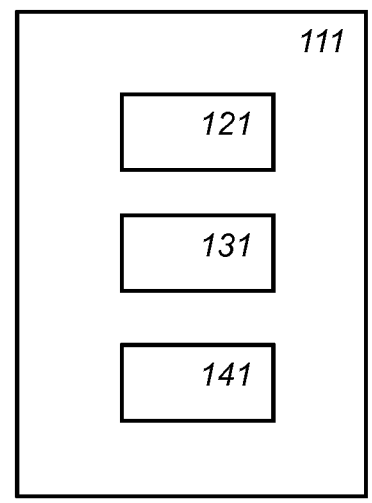

FIG. 1a and FIG. 1b schematically show possible embodiments of graph layout devices for determining a layout of a graph. Graph layout device 110 shown in FIG. 1a comprises a processor 130 and a memory 140. Graph layout device 111 shown in FIG. 1b comprises a display 121, a processor 131, and a memory 141. For example, memories 140, 141 may comprise software and/or data on which respective processors 130, 131 are configured to act. Processors 130, 131 may be implemented as one or more processor circuits, e.g., microprocessors, ASICs, FPGAs, and the like. The processors may be provisioned, e.g., within a cloud computing architecture, etc. Further examples are shown herein. Memories 140, 141 may comprise computer program instructions which are executable by respective processors 130, 131. Processors 130, 131, possibly together with respective memories 140, 141, are configured according to an embodiment of a graph layout device.

FIG. 2, FIG. 3a-3c below show functional units that may be functional units of the processor. For example, FIG. 2 may be used as a blueprint of a possible functional organization of the processor. The processors are not shown separate from the units in FIG. 2 and FIG. 3a-3c but are shown in FIG. 1a and FIG. 1b. For example, the functional units shown in FIG. 2 may be wholly or partially implemented in computer instructions that are stored at device 110, e.g., in an electronic memory of device 110, and are executable by a microprocessor of device 110, and similarly for device 111. In hybrid embodiments, functional units are implemented partially in hardware, e.g., as coprocessors, e.g., crypto processors, and partially in software stored and executed on device 110 and/or 111.

Figure 2:
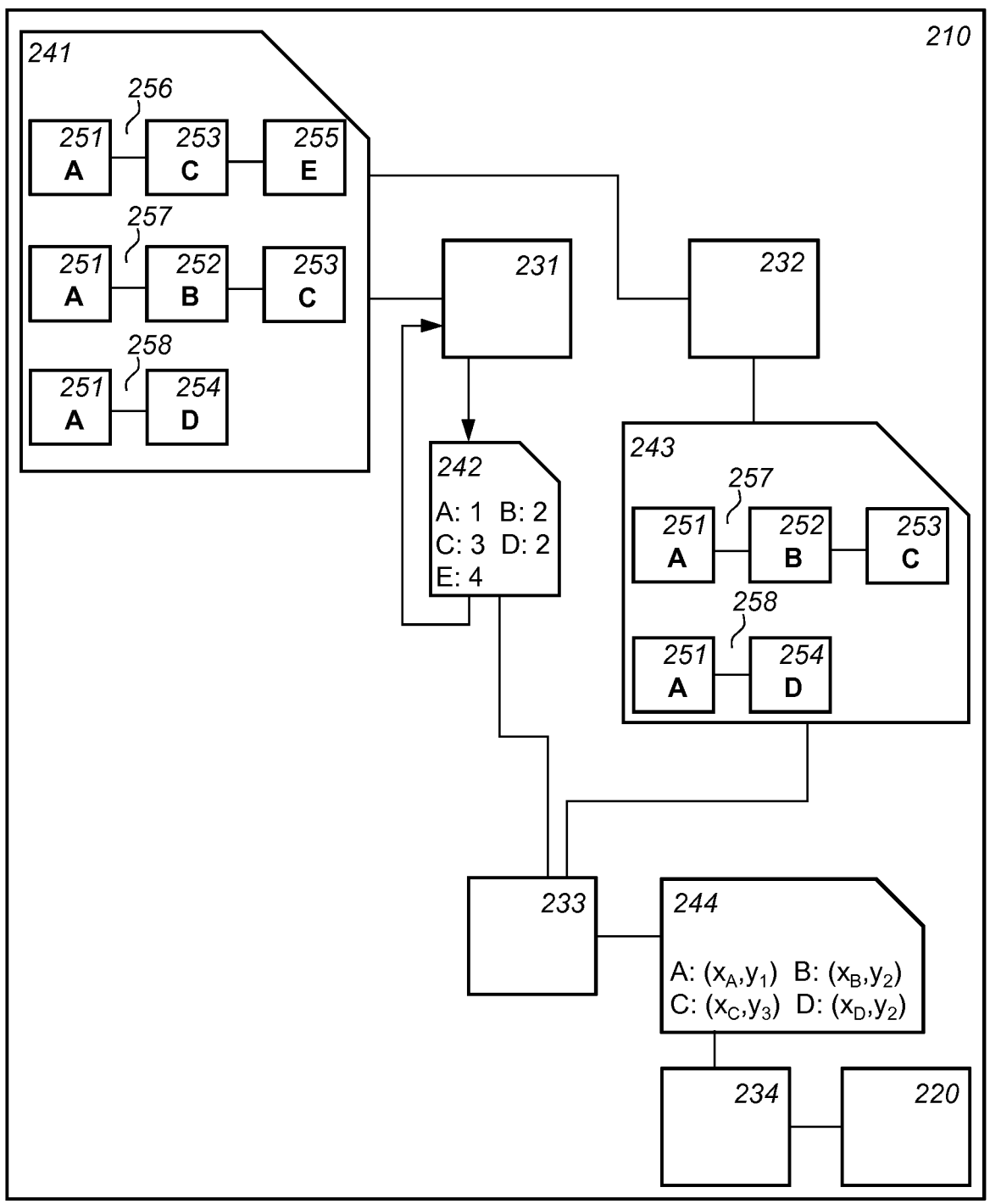

FIG. 2 schematically shows a possible embodiment of a graph layout device 210. As pointed out above, FIG. 2 shows functional units which may be implemented by the processor. FIG. 2 also shows some data elements for the purpose of explication. Graph layout device 210 is configured for determining a layout 244 of a graph. The layout comprises a position, e.g., an x-coordinate and a y-coordinate, of each node of the graph. The layout may also comprise positions of additional layout elements, e.g., of dummy nodes, as discussed below.

As described in more detail below, determining layout 244 comprises several steps that are performed by respective units of graph layout device 210, e.g., ranking unit 231, filtering unit 232, layout 233, and optionally rendering unit 234. The device determines a layout 244 of a graph induced by a set of nodes that is a subset of a global set of paths obtained through filtering. Ranking unit 231 of graph layout device 210 computes a global rank assignment 242 assigning a rank to each node in the set of nodes. Nodes of the graph with equal rank assignments are positioned adjacent to each other in the graph layout. Interestingly, the rank assignment is a global rank assignment based on the global set of paths, thereby improving stability. Filtering unit 232 filtering the global set of paths to obtain the set of paths inducing the graph. Layout unit 233 computes the layout of the graph based on global rank assignment 242 in such a way that nodes of the graph with equal rank assignments are positioned adjacent to each other. Rendering unit 234 optionally renders the graph. Ranking unit 231 optionally performs a cycle removal step, for example, as detailed in "Handbook of Graph Drawing and Visualization" by Roberto Tamassia (editor), section 13.2, "Cycle Removal", included herein by reference. Graph layout device 210 optionally performs an edge concentration step, for example, as detailed in "Handbook of Graph Drawing and Visualization" by Roberto Tamassia (editor), section 13.4, "Edge Concentration", included herein by reference.

Interestingly, ranking unit 231 computes a global rank assignment and layout unit 233 computes the layout of the graph based on this global rank assignment. This has the advantage that, when layouts of multiple graphs are based on the same global rank assignment, this rank assignment can be re-used, leading to more efficient computation of the graph layout and increased stability between the layouts of the multiple graphs. Improved stability may be observed in several ways, e.g., by observing that the distance between given nodes x and y is similar in two graph layouts and/or that graphical objects, e.g., nodes or edges, have similar locations in two graph layouts, and/or that layout adjustments generally preserve the direction of nodes, e.g., if a node is to the left of another node in the layout of one graph, it is generally to the left of the node in the layout of another graph as well. Moreover, since the computation of the layout of the graph uses information on the set of paths inducing the graph, the layout of the graph better reflects the underlying data, as also discussed in more detail below.

The graph for which layout device 210 determines a layout is induced as detailed below by a set of paths 243 through a set of nodes. The nodes of the graph are comprised in the set of nodes. A path typically comprises an ordered sequence of nodes. For example, FIG. 2 schematically shows five nodes 251-255, labelled "A" to "E". Set of paths 243 comprises two paths, path 257 comprising the ordered sequence of nodes 251, 252, and 253 and path 258 comprising the ordered sequence of nodes 251 and 254. For the purpose of explanation, we may denote a path as a sequence of labels, e.g., path 257 may be denoted "ABC" and path 258 may be denoted "AD". Various paths through the set of nodes may be arbitrarily related to each other, e.g., pairs of paths may be disjoint, or partially or wholly overlapping, e.g., one path may be a subpath of the other, e.g., one path is a prefix or suffix of the other path. Nodes may occur in different paths in a different order, e.g., set of nodes 243 may comprise path "AD" in which node A precedes node D as well as path "DA" in which node A directly succeeds node D, or path "DBA" in which A indirectly succeeds node D. Paths are typically distinct but this is not necessary. Not all nodes in the set of nodes necessarily occur in a path from set 243 of paths, e.g., node "E", 255, does not occur in a path from set 243.

The graph being induced by set 243 of paths may be a directed graph. Such a directed graph may comprise a set of nodes and a set of edges, an edge being an ordered pair of vertices. The graph may contain loops. The set of nodes may also be a multiset, e.g., the graph is a multigraph or multidigraph; the graph may be a particular type of directed graph, e.g., a directed acyclic graph and/or a strongly connected graph, or it may be a directed graph with supplementary properties, e.g., a weighted directed graph, e.g., a graph in which each edge has a weight assigned to it. The graph may also be a flow network in which one node is distinguished to be a source node and another node is distinguished to be a sink node. Various other known subclasses and variants of directed graphs may be used. The graph being induced by set 243 of paths may also be an undirected graph. An undirected graph may comprise a set of nodes and a set of edges, an edge being a set of two nodes or a 2-multiset of two nodes, e.g., an edge representing a loop may be a 2-multiset containing the same node twice. The graph may be a special type of undirected graph distinguished in the literature, e.g., a connected graph or a planar graph, and/or an undirected graph with supplementary properties, e.g., a weighted undirected graph or an undirected multigraph.

The graph may be induced by set of paths 243 in various ways. In some embodiments, nodes of the graph are comprised in a union of nodes along paths from the set of paths, edges of the graph being comprised in a union of edges along paths from the set of paths. For example, all nodes occurring in a path in set 243 of paths may be nodes of the graph, and all edges occurring in a path in set 243 of paths may be edges of the graph. For example, consider set 243 of paths comprising path "ABC", 257, and path "AD", 258. The graph induced by this set of paths may have nodes "A", "B", "C", and "D", and edges from "A" to "B", from "B" to "C", and from "A" to "D". For example, the graph may be obtained by superimposing the various paths, e.g., path "ABC" and path "AD", on the set of nodes. The graph may be a subgraph of the graph defined in this way, e.g., the graph is obtained as a subgraph of a complete induced graph, the complete induced graph comprising nodes occurring in a path in set 243 of paths and edges occurring in a path in set 243 of paths. For example, the graph may be obtained as a subgraph of the complete induced graph by filtering according to a criterion, e.g., by filtering out all edges that satisfy a certain criterion, e.g., by filtering out all edges with a weight below a threshold and/or filtering out all nodes that do not have incoming or outgoing edges, e.g., after filtering out edges. The criterion, e.g., the threshold, may be obtained by graph layout device 210 as an input, e.g., an input given by the user, or computed by graph layout device 210 itself. The graph may also be induced by set of paths 243 in other ways, e.g., a path may induce edges between all pairs of nodes along the path, or similar.

In different applications, the set of nodes and the set 243 of paths may represent different kinds of objects. In some embodiments, nodes represent activities and paths represent temporal sequences of activities. Activities may be processing steps or operating steps, e.g., steps of a process for producing a product or delivering a service. For example, a path may correspond to a case, e.g., a sequence of events, wherein an event comprises an activity taking place at a particular time as part of the case. An activity may be a type of event. Different cases may correspond to the same path. For example, a case comprising a login activity at 11:15 am and a logout activity at 11:30 am and a case comprising a login activity at 11:45 am and a logout activity at 12:30 pm may both correspond to a path "IO" though set of nodes "I", "O", node "I" representing a login activity and node "O" representing a logout activity. Other nodes may represent other activities, e.g., screen locking, sending an e-mail, and the like. For example, in such a case, the graph induced by set 243 of paths may have as nodes the activities in a given set of cases and edges between activities directly succeeding each other in one of the cases. The graph may also be a subset of the graph defined in this way, e.g., the graph may comprise edges between activities that have directly succeeded each other in at least a minimum number of cases, e.g., in 10 or 100 cases, and/or nodes representing activities with at least one incoming or outgoing edge.

As another example, nodes may represent physical locations and paths may represent routes between these locations, e.g., transport routes. For example, a node may represent a junction and a path may represent a possibility to travel, via a series of junctions, from a starting point to an end point. For example, a node may represent a junction in a network of cycling routes, a path representing a cycling route in a network of cycling routes and an edge representing a signposted route between two junctions. Or, a node may represent a public transport stop, e.g., a bus, train, tram or ferry stop, and a path may represent a possible way of travelling from a starting point to an end point via public transport, an edge representing a direct public transport route between two public transport stops, e.g., a single train travelling from one train station to the other. Various other uses of nodes, graphs and paths to represent useful real-life concepts are known and may benefit from the graph layout techniques presented here, e.g., system structure diagrams, plans, operations process charts, and logic circuit diagrams.

Interestingly, the set of paths is a subset of a global set of paths 241 through the set of nodes. For example, global set of paths 241 in FIG. 2 comprises paths "ABC", 257, and "AD", 258, from set 243 of nodes, but also path "ACE", 256. For example, global set of paths 241 may comprise all sequences of events in a log, with set of paths 243 comprising a subset of these sequences of events. For instance, set of paths 243 may be selected by a condition. For instance, the condition may be a temporal condition, e.g., the subset of the sequences of events that took place in a given time period, e.g., last week. Or, the condition may be that a path from set of paths 243 satisfies a certain condition or has a certain attribute, e.g., the path has a minimum and/or maximum length, the path has been tagged, e.g., with a predicate, e.g., the predicate "important", or the condition may be that the path contains a particular node or particular type of node, e.g., a particular activity. As discussed in more detail later, set of paths 243 is obtained from global set of paths 241 by filtering. Global set of paths 241 is used to compute a global rank assignment 242, and global rank assignment 242 is used to compute the layout 244 of the graph. This may have several advantages compared to traditional methods that do not use a global set of paths and/or a global rank assignment, e.g., increasing stability between layouts of graphs induced by different sets of paths, decreasing the computational complexity of computing the graph layout, and/or ensuring that particular paths from the global set of paths, e.g., paths with a high weight, are shown consistently and in such a way that nodes from such particular paths are more often shown in the order in which they occur in those paths.

Graph layout device 210 comprises a ranking unit 231. Ranking unit 231 computes global rank assignment 242 assigning a rank to each node in the set of nodes. Global rank assignment 242 facilitates determining a layout of the graph according to layered graph drawing techniques. Preferably, global rank assignment 242 satisfies the property that, for each path in global set of paths 241, distinct ranks are assigned to nodes along the path. This property is beneficial in layered graph drawing for avoiding that nodes along the path are drawn adjacent to each other and thereby reducing the number of edge crossings, since the layout of the graph is computed such that nodes of the graph with equal rank assignments are positioned adjacent to each other. Interestingly, a rank is assigned to each node in the set of nodes, e.g., also to node 255 that occurs in path 256 from global set of paths 241 but that does not occur in a path from set of paths 243. As a consequence, global rank assignment 242 can be re-used when computing layouts of other graphs, e.g., a graph induced by a different set of paths through the set of nodes. Hence, layouts of multiple graphs can be based on the same global rank assignment 242, improving the stability between the layouts of these different graphs and improving the efficiency with which the graph layout is computed.

In order to compute global rank assignment 242, ranking unit 231 iteratively selects a path from global set of paths 241 and updates global rank assignment 242 based on the selected path. For example, ranking unit 231 selects a path, updates the global rank assignment, selects another path, updates the global rank assignment, etcetera, until the desired global rank assignment has been obtained. In a preferred embodiment, ranking unit 231 iterates over all paths from global set of paths 241, but this is not necessary: it is also possible to iterate only over a subset of the paths, e.g., only a fixed number of paths, e.g., the first 10 or 10% of paths, or only paths satisfying a certain property, e.g., only paths with weight at least 10, or to iterate until a certain criterion is satisfied, e.g., until the global rank assignment satisfies a certain property, e.g., until a rank has been assigned to all nodes in the set of nodes or to all nodes occurring in paths in set 243 of nodes or until the global rank assignment has remained static over a number of iterations, e.g., over the last five iterations. Advantageously, instead of just using the graph itself as an input, e.g., information about which nodes and edges the graph comprises, ranking unit 231 is able to draw on additional information, e.g., global set of paths 241, that is not normally available in ranking or layer assignment methods used for computing graph layouts, hence enabling more efficient computation of rank assignment 242, as well as resulting in a rank assignment 242 that more closely matches to the underlying data, e.g., the global set of paths 241. For instance, it is desirable for the layout of the resulting graph to match the order of nodes in paths in the global set of paths 241, e.g., nodes from one or more paths from set of paths 241 should appear generally left-to-right or top-to bottom in the layout. Advantageously, ranking unit 231 may use global set of paths 241 to improve such matching.

Various methods are possible to select a path from global set of paths 241. In a preferred embodiment, a path from global set of paths 241 has a corresponding weight. Ranking unit 231 may sort the global set of paths by weight, e.g., ascending or descending. Ranking unit 231 may then iteratively update global rank assignment 242 in the order of the sorted global set of paths, e.g., iteratively selecting a path from global set of paths 241 may comprise selecting a next path from the sorted global set of paths. In a preferred embodiment, paths are selected in descending order of weight. As a consequence, high-weight paths are used in earlier updates of the global rank assignment, which may cause such paths to more heavily influence the global rank assignment, and hence the layout of the graph, than other paths. This may have the advantage that more important paths feature more prominently in the resulting graph layout.

The weight of a path may be computed by graph layout device 210, it may be received as an input, or it may be specified by a user, e.g., the user specifies a weight of at least one path, e.g., through a user interface of graph layout device 210. For instance, a default weight may be assigned to a path, e.g., by graph layout device 210, and the user may override this default weight for one or more, e.g., all, paths. This may cause the paths selected by the user to feature more prominently in the layout of the graph than other paths. In some embodiments, a weight or default weight of a path from global set of paths 241 represents a number of occurrences of the path. In such cases in particular, the set of high-weight paths may be the same or similar for different sets of paths that are subsets of the same global set of paths since frequent occurrences are likely to occur in multiple subsets, thus improving the accuracy of the global rank assignment for different subsets of the global set of paths. E.g., paths from global set of paths 241 may represent temporal sequences of activities and a weight may represent a number of times an instance of the temporal sequence of activities has occurred, e.g., in a log file.

Other methods or variations on the above methods to iteratively select a path are also possible, e.g., a path may be randomly selected, e.g., uniformly at random or biased, e.g., with a probability proportional to the weight of the path.

Having selected a path, ranking unit 231 updates global rank assignment 242 based on the selected path. Updating global rank assignment 242 may comprise assigning ranks to nodes, e.g., from the selected path, to which no rank was previously assigned and/or updating ranks that were previously assigned to nodes from the selected path or other nodes. Ranking unit 231 preferably starts with an initially empty rank assignment, e.g., no rank has been assigned to a node. Alternatively, ranking unit 231 starts with a rank assignment in which a default rank has been assigned to all nodes, e.g., all nodes have been assigned the same rank or all nodes have been assigned a random rank. In some embodiments, after updating global rank assignment 242 based on the selected path, a rank is assigned by global rank assignment 242 to all nodes along paths that have been processed by ranking unit 231 so far.

In some embodiments, ranking unit 231 updates global rank assignment 242 wherein distinct ranks are assigned to nodes along the selected path. In particular, this may facilitate that distinct ranks are assigned to nodes along each path from global set of paths 241, which is desirable for layered graph drawing, as discussed above. For example, ranking unit 231 may detect that the same rank has previously been assigned to a first node and a second node along the selected path. In this case, ranking unit 231 may update the rank assignment to make the ranks of the first node and second node distinct, e.g., by incrementing the rank of the second node by one. The ranks of one or more other nodes may also be incremented, e.g., the ranks may be incremented of all nodes that have a rank greater than or equal to the rank of the second node and/or that directly or indirectly follow the second node along a path selected so far, or similar.

Preferably, after each iteration, distinct ranks are assigned to all nodes in the selected path and/or all paths that have been selected before, e.g., ranking unit 231 may maintain as an invariant that distinct ranks are assigned to nodes that are directly connected in paths that have been selected. However, this is not necessary, e.g., ranking unit 231 may not guarantee this property as an invariant while performing the iterations but instead achieves this by postprocessing after the iterations have been performed.

Rankings are typically integral, although other ordered sets of rank values may also be used. The ranks assigned to nodes in global rank assignment 242 do not need to be consecutive, either during the computation of the global rank assignment 242 or after the computation is completed; for instance, rank 1 may be assigned to one or more nodes and rank 3 to other nodes, with no rank being assigned rank 2. Not assigning consecutive ranks may be beneficial, especially during the computation of the global rank assignment, since it may simplify assigning a rank to a node that is between two previously assigned ranks by not having to update the previously assigned ranks. For example, if node A has rank 1 and node B has rank 2 then, to assign an integral rank to node C that is in between the ranks of node A and node B it would be necessary to update either the rank of A or the rank of B whereas if node A has rank 100 and node B has rank 200 then it is possible to assign a rank of 150 to C without affecting the ranks of A or B. Similarly, in some embodiments, ranks may be negative, e.g., during the computation of global rank assignment 242. This may be beneficial for simplifying the computation of the global rank assignment since it may simplify assigning a rank to a node that is smaller than all previously assigned ranks, e.g., a rank may be assigned to a node that is one unit smaller than all previously assigned ranks, e.g., the smallest previously assigned rank may be −2 and a rank of −3 may be assigned to the node. The ranks in global rank assignment 242 are not necessarily explicitly stored in memory during and/or after the computation by ranking unit 231; for instance, ranks may be stored implicitly by maintaining a linked list of levels, each level comprising a set of nodes to which the same rank has been assigned, or by similar data structures. In the examples below we explicitly give integral ranks for the purpose of clarity, but it will be understood that these ranks may be implicit.

Figure 3A:
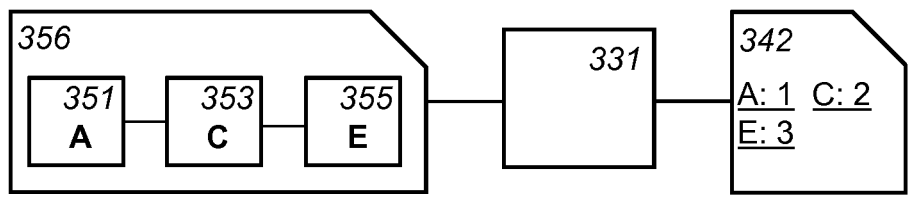

FIG. 3a schematically shows an example of an embodiment of a ranking unit 331. In FIG. 3a, ranking unit 331 updates global rank assignment 342 based on selected path "ACE", 356, by assigning ranks 1, 2, and 3 to nodes A, 351, C, 353, and E, 355, to which no global ranks were previously assigned. For example, path 356 is the first selected path and ranking unit 331 updates global rank assignment 331 by assigning increasing ranks, e.g., consecutive ranks, to respective nodes from selected path 356.

Figure 3B:
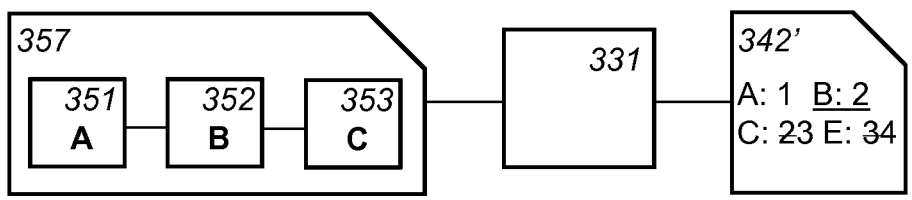

FIG. 3b schematically shows an example of an embodiment of a ranking unit 331. This figure exemplifies the situation that a first node, e.g., node "B", 352, occurs between a second node, e.g., node "A", 351, and a third node, e.g., node "C", 353, along the selected path, e.g., path "ACE", 356, wherein no rank is assigned to the first node and ranks are assigned to the second node and the third node, e.g., rank 1 is assigned to node "A", 351 and rank 2 is assigned to rank "C", 353. In such a situation, the global rank assignment may be updated wherein a rank is assigned to the first node that is in between the rank assigned to the second node and the rank assigned to the third node. For example, in FIG. 3b, rank 2 is assigned to first node "B", 352, and the rank of third node "C", 353, is updated to 3 such that the rank of node 352 is in between the rank of node 351 and the rank of node 353.

There may be multiple nodes between the second and third node to which no rank has been assigned, in which case a rank may be assigned to each of these nodes, preferably distinct ranks, e.g., sequential ranks. Ranks may also be updated of nodes other than the second node and the third node. For example, ranks may be updated such that nodes that have distinct ranks prior to the updating also have distinct ranks after the updating. For instance, in FIG. 3b, the rank of node E, 355, is updated from 3 to 4 such that nodes C, 353 and E, 355 have distinct ranks after the updating. For example, a desired rank may be assigned to a node by incrementing the ranks of nodes that are greater than or equal to the desired rank by one and then assigning the desired rank to the node.

Figure 3C:
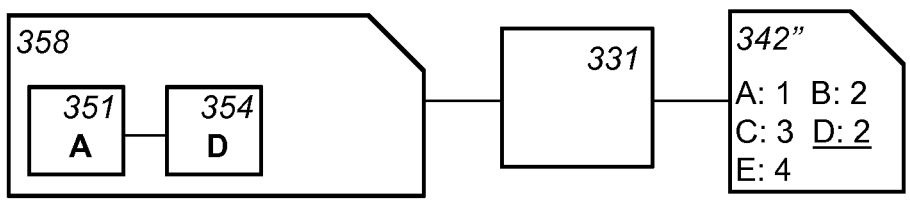

FIG. 3c schematically shows an example of an embodiment of a ranking unit 331. This figure exemplifies the situation that a node, e.g., node "D", 354, along the selected path, e.g., path "AD", 358, precedes or follows all other nodes along the selected paths to which a rank is assigned, e.g., node "A", 351. In such a situation, ranking unit 331 may update the global rank assignment wherein a rank is assigned to the node that is smaller or larger than the ranks of said all other nodes. For example, in FIG. 3c, rank 2 is assigned in global rank assignment 342" to node "D", 354, which is larger than the ranks of the node "A", 351, that precedes it. There may be multiple nodes preceding and/or multiple nodes succeeding all nodes along the selected path to which a rank is assigned, in which ranks may be assigned to each of these preceding and/or succeeding nodes, preferably distinct, e.g., increasing. The rank assigned may directly precede or succeed the assigned ranks, as in this example, but this is not necessary, e.g., also rank 3, 4, or a larger rank could have been assigned to node "D", 354.

Previously assigned ranks of nodes along the path may be updated as well, e.g., if path "AB" is selected and rank 1 has been assigned to node "B", then the rank of "B" may be updated to 2 and the rank of "A" may be set to 1. As above, ranks of other nodes may be updated as well, e.g., in order to assign a desired rank to a node that is smaller than the ranks of said all other nodes, all existing ranks in global rank assignment 342" that have already been assigned and are greater than or equal to the desired rank may be incremented and the desired rank may be assigned to the node. The rank assigned to the node may be smaller if the node precedes said all other nodes and larger if it succeeds them. However, ranking unit 331 may also assign a rank that is larger than the ranks of said all other nodes if the node precedes said all other nodes, e.g., if rank 3 has been assigned to node "B" and rank 2 has been assigned to node "C" and the selected path is "AB", then rank 4 may be assigned to node "A" instead of rank 1, e.g., increase the compactness of the resulting layout of the graph. Similarly, ranking unit 331 may assign a rank that is smaller than the ranks of said all other nodes if the node succeeds said all other nodes.

In some embodiments, instead of assigning a rank to the node that is smaller or larger than the ranks of said all other nodes, a rank is assigned that is smaller or larger than that of an immediately preceding or succeeding node but not necessarily smaller or larger than the ranks of said all other nodes. This may be beneficial to limit the overall number of ranks in the global rank assignment, possibly leading to a more compact graph.

Figure 5A:
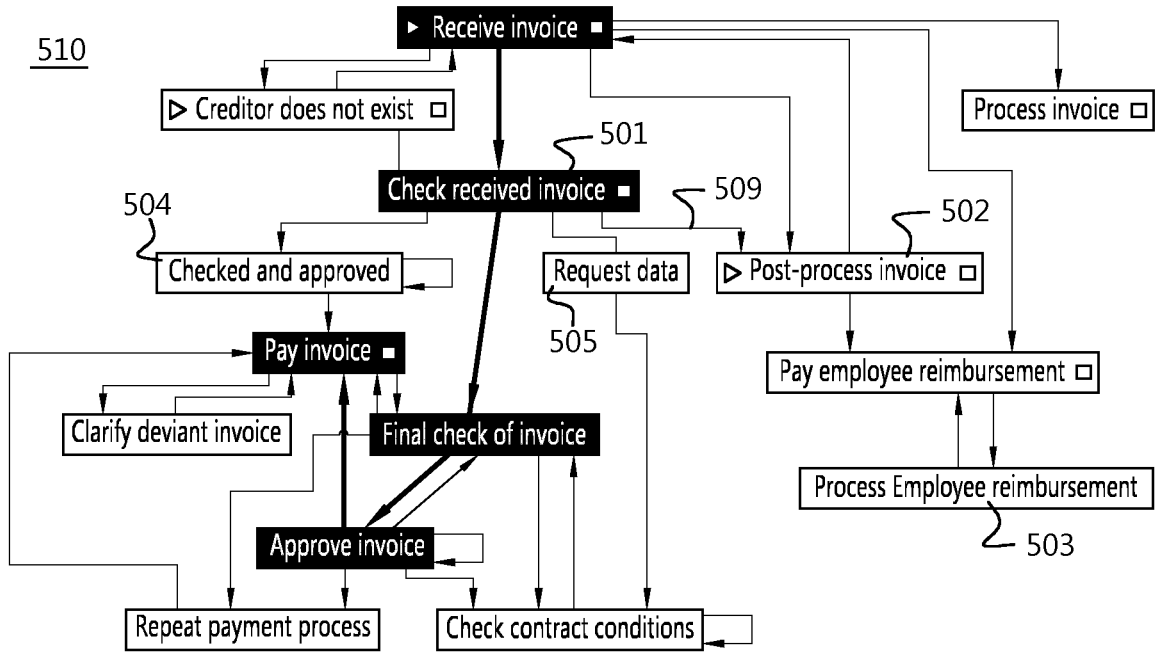
FIG. 5a shows an example of a graph rendered according to a layout of the graph computed using "dot"
Figure 5B:
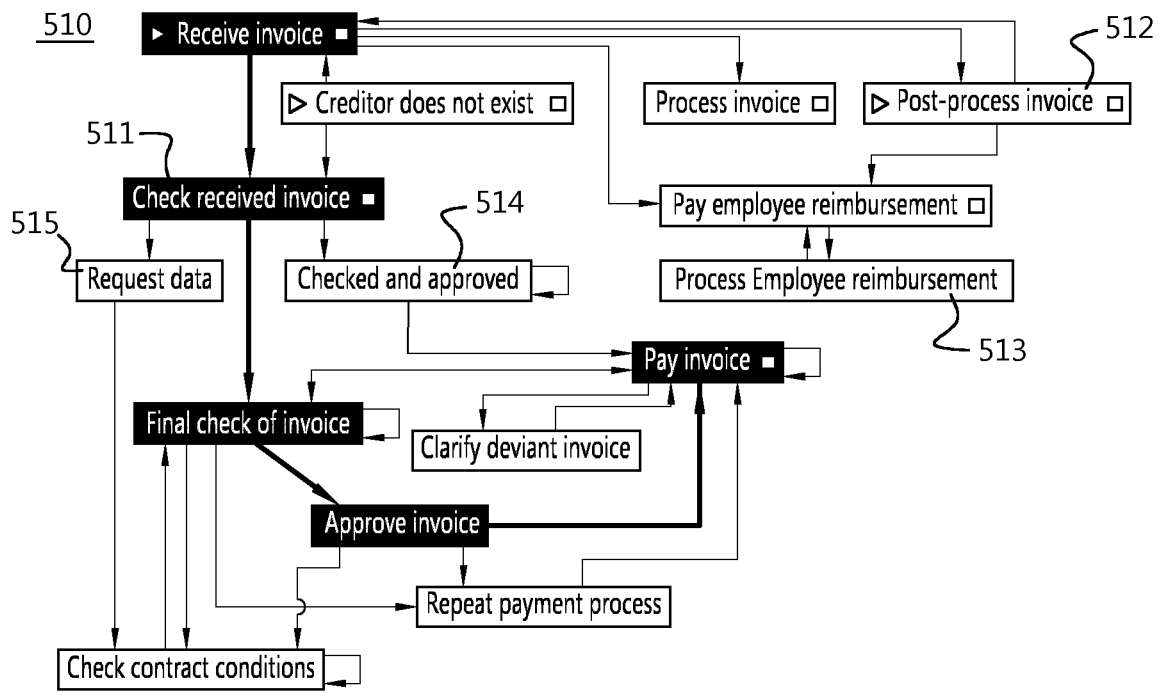
FIG. 5b shows an example of a graph rendered according to a layout of the graph computed using "dot"

FIGS. 5a, 5b, 6, and 7 show examples of graphs rendered according to graph layouts showing some of the advantages achieved by graph layout 210, e.g., increased stability. FIG. 5a shows a graph 500 rendered according to a layout of the graph computed using "dot", a known tool from the Graphviz graph visualization software (https://www.graphviz.org/). "dot" is a graph layout program that makes "hierarchical" or layered drawings of directed graphs. The layout algorithm aims edges in the same direction (top to bottom or left to right) and then attempts to avoid edge crossings and reduce edge length. The graph comprises node 501, labelled "Check received invoice", node 502, labelled "Post-process invoice", and an edge 509 from node 501 to node 502. FIG. 5b shows a rendering 510 of a graph that has been obtained from the graph of FIG. 5a by filtering, rendered according to a layout of the graph computed using "dot". The graph rendered in FIG. 5b is the same as the graph rendered in FIG. 5a, e.g., it comprises the same nodes and edges between them, except that edge 509 has been filtered out. E.g., in layout 510, the node labelled "Check received invoice", 511, is not connected by an edge to the node labelled "Post-process invoice", 512. As can be seen from the figures, this small difference between the two graphs leads to a big difference between the two graph layouts 500 and 510, e.g., the stability between the two graphs is poor. Layouts 500 and 510 look dissimilar, e.g., it is hard to see that they represent almost the same graph. For example, this would complicate rendering an animation morphing layout 500 into layout 510. In particular, note that the nodes labelled "Process employee reimbursement", 503 and "Checked and approved", 504 are not adjacent in layout 500 but the corresponding nodes 513 and 514 are adjacent in layout 510.

Figure 6:
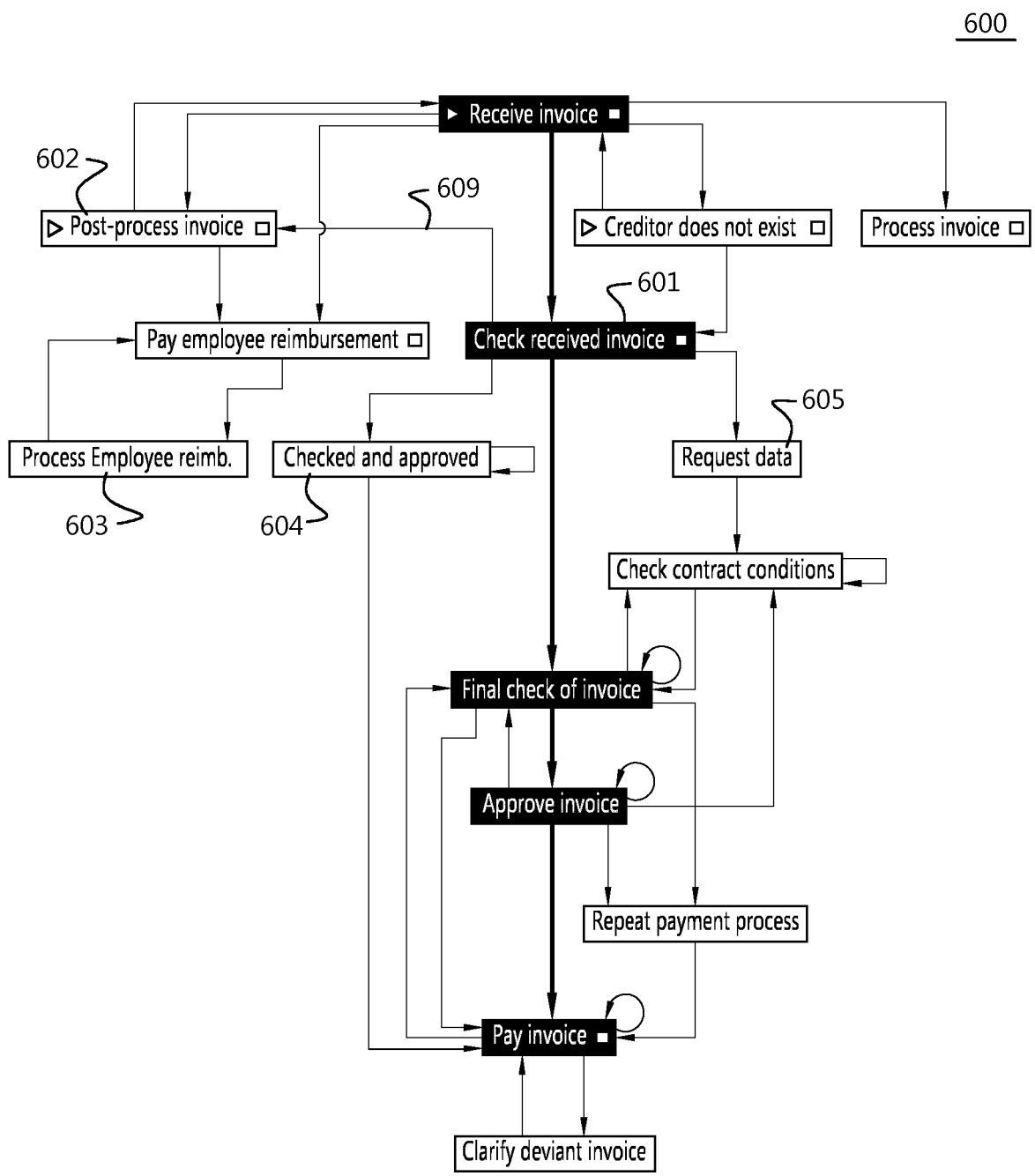
FIG. 6 shows an example of the graph of FIG. 5a rendered according to a layout of the graph computed according to an embodiment.
Figure 7:
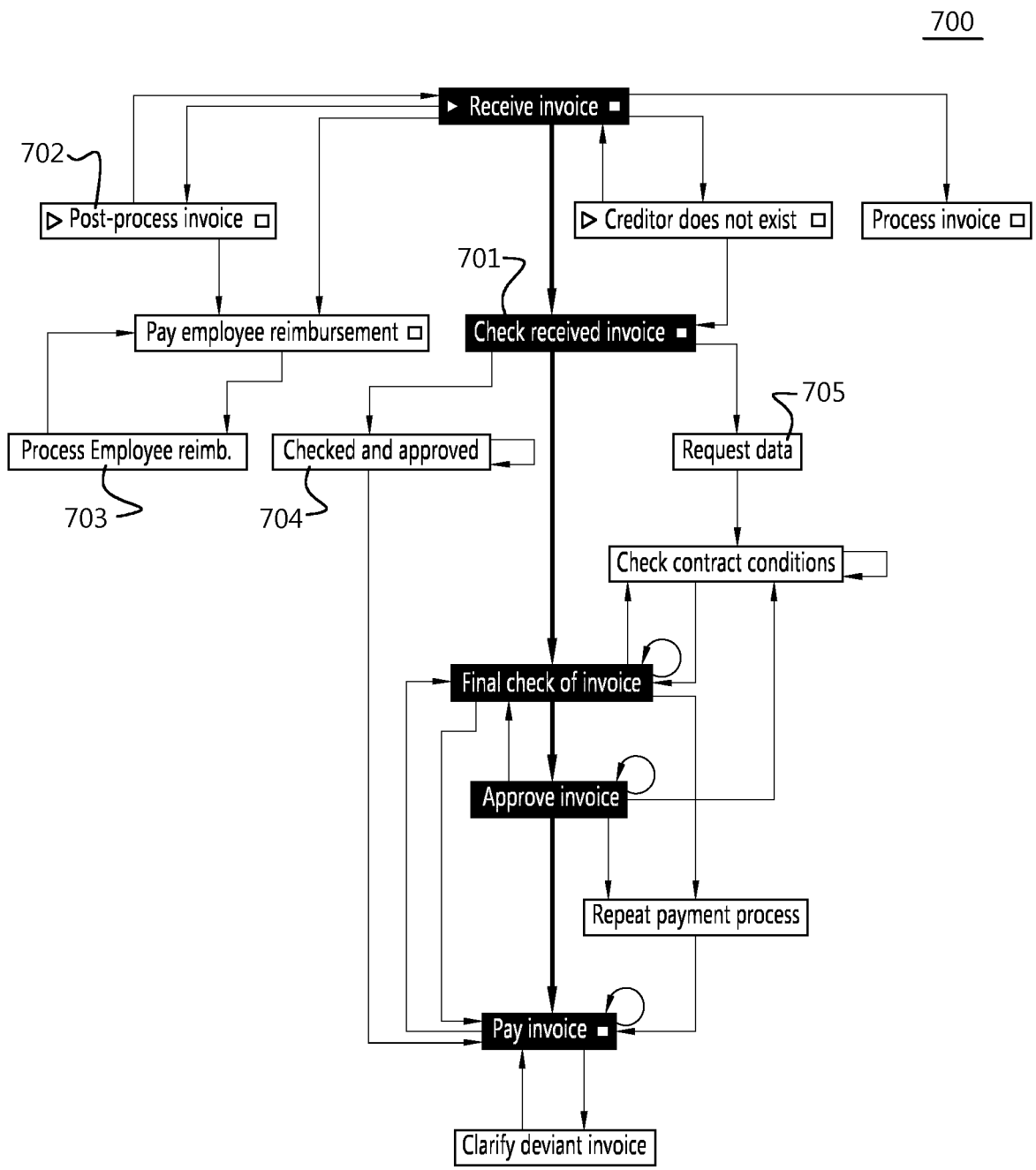
FIG. 7 shows an example of the graph of FIG. 5b rendered according to a layout of the graph computed according to an embodiment, FIG. 8 schematically shows an example of an embodiment of a graph layout method, FIG. 9a schematically shows a computer readable medium having a writable part comprising a computer program according to an embodiment, FIG. 9b schematically shows a representation of a processor system according to an embodiment.

FIG. 6 shows the same graph 600 as FIG. 5a, now rendered according to a layout computed according to an embodiment. As can be seen from the figure, the node labelled "Check received invoice", 601, is connected to the node labelled "Post-process invoice", 602, by an edge 609. FIG. 7 shows the same graph 700 as FIG. 5b, rendered according to a layout computed according to an embodiment. Here, the nodes labelled "Check received invoice", 701 and "Post-process invoice", 702, are not connected by an edge. Both graphs are induced by respective sets of paths through a common set of nodes, the respective sets of paths being subsets of a global set of paths. For example, graph 700 is obtained from graph 600 a by filtering that removed edge 609 from the graph. The layouts of both graphs are based on the same global rank assignment. As a consequence, the same nodes are adjacent to each other in both graph layouts. For examples, nodes that adjacent in layout 600 are adjacent in layout 700 and vice versa, e.g., the node labelled "Process employee reimbursement", 603 is adjacent to the node labelled "Checked and approved", 604 in layout 600 and the corresponding nodes 703 and 704 are adjacent in layout 700 as well. This was not the case in graphs 500 and 510 computed using "dot", as discussed above. As a result, layouts 600 and 700 have improved stability, in particular, the renderings of the two layouts look almost exactly the same, e.g., allowing users to easier inspect changes between the respective graphs. For example, this facilitates rendering an animation morphing layout 600 into layout 700.

Returning to FIG. 2, graph layout device 210 comprises a filtering unit 232. Filtering unit 232 filters global set of paths 241 to obtain set of paths 243. Set of paths 243 may be a subset of set 241. For example, in FIG. 2, filtering unit 232 selects paths "ABC", 257, and "AD", 258 comprised by set of paths 243 from global set of paths 241. Set of paths 243 does not need to be stored explicitly in memory; for example, set 243 may be stored as a list of references to paths in global set of paths 241, as a bit map indicating which of the paths from global set of paths 243 occur in the set of paths, or the like. As discussed above, paths may represent various kinds of objects such as temporal sequences of activities. Filtering these paths may correspondingly take place in various ways. For example, selecting a path may comprise evaluating a criterion based on at least one of a weight of the path, a length of the path, times of activities corresponding to nodes in the path, and whether the path contains a particular edge, node, or type of node. For example, a path may be selected if the activities corresponding to its nodes took place in the last month, if a particular person was involved in an activity of the path, if the path comprises a particular node or edge, or a similar criterion. In any case, obtaining set of paths 243 from global set of paths 241 for which global rank assignment 242 is determined has the advantage that global rank assignment 242 can be used to determine the layout of the graph, improving the efficiency of determining the layout of the graph and improving the stability of the graph layout when layouts of multiple graphs induced by subsets of global set of paths 241 are computed.

Figure 3D:
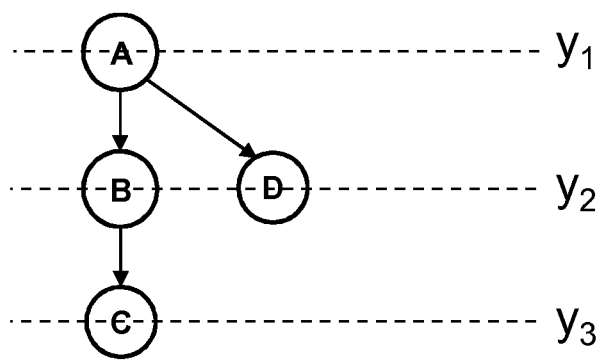

Graph layout device 210 further comprises a layout unit 233. Layout unit 233 computes the layout of the graph 244 based on global rank assignment 242. The layout comprises a position, e.g., an x-coordinate and a y-coordinate, of each node of the graph. Nodes of the graph with equal rank assignments are positioned adjacent to each other. For instance, nodes of the graph with equal rank assignment are assigned the same or similar x-coordinates or the same or similar y-coordinates. In the example shown in FIG. 2, node "A", 251, has position $(x_A, y_1)$; node "B", 252, has position $(x_B, y_2)$; node "C", 253, has position $(x_C, y_3)$; and node "D", 254, has position $(x_D, y_2)$. Since node "B", 252 and node "D", 254, have the same rank according to rank assignment 242, they are assigned the same y-coordinate, $y_2$. On the other hand, node "A", 251 and node "C", 253, have different ranks so in this example they are assigned y-coordinates $y_1$ and $y_3$, respectively, that are different from $y_2$. FIG. 3d schematically shows an example of a graph rendered according to layout of the graph 244. In an embodiment, layout unit 233 computes the layout using known layered graph drawing approaches, e.g., by performing vertex ordering, x-coordinate assignment and optionally edge concentration as described in sections 13.5, "Vertex Ordering"; 13.6, "x-Coordinate Assignment"; and 13.4, "Edge Concentration" of the "Handbook of Graph Drawing and Visualization" by Roberto Tamassia (editor), included herein by reference.

In some embodiments, layout of the graph 244 further comprises a position of one or more dummy nodes. Layout unit 233 may add dummy vertices and/or dummy edges to the graph. In some embodiments, layout unit 233 adds a path comprising dummy vertices and dummy edges between first and second nodes of the graph that have an edge between them and whose ranks differ by more than one. Layout unit 233 may temporarily or permanently remove the original edge from the graph. The dummy edges are assigned consecutive ranks. Dummy edges and vertices may facilitate subsequent steps performed by layout unit 233 and/or other units, e.g., further operations of layout unit 233 may assume that vertices span a single layer and/or rendering unit may use the determined positions of the one or more dummy nodes to draw edges between nodes of the graph, e.g., non-dummy nodes of the graph.

Computing the layout of the graph 244 based on the global rank assignment 242 may comprise adapting the global rank assignment to the graph, e.g., by eliminating nodes from the global rank assignment that do not occur in the graph and/or eliminating ranks to which no node in the graph has been assigned. For example, in the example global rank assignment 242 shown in FIG. 2, rank 4 is assigned to node "E", 255, but this node does not occur in the graph induced by set of nodes 243. Hence, layout unit 233 may eliminate node "E" and/or rank 4 from the global rank assignment 242. Eliminating a rank from the global rank assignment may comprise shifting higher ranks such that ranks occur successively in the adapted global rank assignment, e.g., eliminating a rank from the global rank assignment may comprise decreasing all ranks higher than the eliminated rank by one. Adapting the global rank assignment may be performed in-place, e.g., by editing the global rank assignment. Preferably, however, the global rank assignment is not performed in-place, e.g., a deep or shallow copy of the global rank assignment is made and the adaptations are performed on the copy, so that the global rank assignment 242 itself may be re-used for other graphs.

Nodes with equal rank assignment may not be completely adjacent to each other, for instance, they may just be approximately adjacent, e.g., it may be advantageous to slightly move one of the nodes with respect to the adjacent position, e.g., to reduce the number of crossings in the graph or to draw a shorter or more straight edge between two nodes. However, generally, nodes appear in increasing order of rank along a non-adjacent direction, e.g., nodes with the same rank assignment are adjacent in the x-direction and nodes with higher y-coordinates have higher ranks, or similar with the x- and y-orientations swapped. Having computed the layout of the graph 244, layout unit 233 stores the layout of the graph 244 in the memory, e.g., memory 140 in FIG. 1*a* or memory 141 in FIG. 1*b*.

In some embodiments, layout unit 233 computes the layout of the graph by determining a set of nodes with equal rank assignment, determining an ordering of this set of nodes, and assigning a position to a node in said set of nodes according to global rank assignment 242 and this ordering. For example, layout unit 233 may partition all nodes of the graph into sets of nodes with equal rank assignment, and/or assign positions to all nodes in each set of nodes with equal rank assignment. The ordering is preferably a linear ordering, e.g., a total order. For example, nodes with equal rank assignments are permuted to reduce the number of crossings among the edges connecting the nodes to nodes with a lower rank, using crossing reduction methods, e.g., heuristic methods, known to the person skilled in the art. This process may be repeated for different ranks until a stable set of orderings for each rank is obtained or until another criterion is satisfied. Layout unit 233 may assign positions to nodes of the graph according to the global rank assignment and the orderings using known techniques from the literature for x-coordinate assignment, e.g., as detailed in "Handbook of Graph Drawing and Visualization" by Roberto Tamassia (editor), section 13.6, "x-Coordinate assignment", included herein by reference.

Interestingly, in some embodiments, layout unit 233 determines a global ordering of nodes and computes an ordering of a set of nodes of the graph with equal rank assignments from this global ordering. For example, layout unit 233 may determine orderings of all sets of nodes of the graph with equal rank assignments from respective global orderings. The global ordering is an ordering, preferably a total or linear ordering, of a set of nodes of a global graph with equal rank assignments. The set of nodes with equal rank assignments is a subset of the set of nodes of the global graph with equal rank assignments, for example, the same rank is assigned to nodes from the set of nodes with equal rank assignment and the set of nodes of the global graph. The global graph is induced by global set of paths 241. For example, the global graph is induced by global set of paths 241 in the same way that the graph is induced by set 243 of paths. For example, the global graph has as nodes the set of nodes, or those nodes occurring in paths in global set of paths 241; and as edges the edges occurring in paths in global set of paths 241; or subsets of these nodes and/or these edges, e.g., as obtained by filtering nodes and/or edges according to a criterion. In some embodiments, known vertex ordering techniques are used to obtain orderings of nodes of the global graph with equal rank assignment, e.g., as described in section 13.5, "Vertex Ordering" of the "Handbook of Graph Drawing and Visualization" by Roberto Tamassia (editor), included herein by reference.

In some embodiments, layout unit 233 determines the orderings of the set of nodes of the global graph with equal rank assignments based on backbone nodes. Layout unit 233 determines a backbone node for each rank. For example, paths may be indexed according to the order in whey they were selected by ranking unit 231 from the global set of paths, the backbone node for a rank being the node along the lowest-indexed paths among nodes assigned the rank. Backbone nodes for subsequent ranks are connected by edges of the global graph, e.g., the backbone node for rank 2 and the backbone node for rank 3 are connected by an edge of the global graph. Backbone nodes may be a dummy node, e.g., a dummy node may be considered to be along the path from the global set of paths along which it was inserted. To determine backbone nodes, layout unit 233 may iterate through paths from global set of paths 241 in the order of ranking unit 231, setting each node along the selected path, e.g., including dummy nodes, to be a backbone node if no backbone node with the same rank was selected yet, continuing until a backbone node for each rank has been determined.

Based on the determined backbone nodes, layout unit 233 divides non-backbone nodes of the graph into connected components. For example, layout unit 233 creates a copy of the graph, removes the backbone nodes and edges to which they are connected from the copy, and divides the copy into connected components. Layout unit 233 orders all nodes of a connected component either before or after the backbone nodes for their respective ranks. E.g., layout unit 233 determines for each connected component if it is a left connected component or a right connected component. If the connected component is a left connected component, layout unit 233 orders nodes of the connected component before the backbone nodes for their respective ranks, e.g., if a node has a certain rank and then it is ordered before the backbone node for that rank. Similarly, if the connected component is a right connected component, layout unit 233 orders nodes of the connected component after the backbone nodes for their respective ranks. A connected component being a left connected component may mean that the nodes of the connected component are assigned a position and/or rendered to the left or top of the backbone nodes, and similarly for right connected components.

Connected components being left connected components or right connected components may be determined such that similar number of nodes are in left and right connected components. For instance, connected components being left or right connected components may be determined by partitioning the set of connected components into two subsets such that the difference between the sum of the respective sizes is minimized, or approximately minimized, using a well-known partitioning optimization algorithm. For instance, layout unit 233 may initially assign the same side to all connected components, and then iterate through the connected components from largest to smallest, changing its side if this reduces the difference between the sum of the sizes of the left connected components and the right connected components.

If multiple nodes are to be assigned an order that is larger or smaller than the order of a backbone node, e.g., two nodes from different left or right connected components of the global graph have the same rank assigned to them, then the relative ordering of the multiple nodes may be determined in various ways, e.g., randomly, or in such a way the number of crossings between edges to a previous or subsequent rank is minimized. One way of determining the relative ordering of the multiple nodes is based on connectedness to the backbone. Connectedness of a node may be defined as the number of nodes with the same path index, e.g., nodes that first occurred in the same path selected by ranking unit 231, that are directly connected by an edge of the graph to a backbone node. The relative ordering of the multiple nodes may be determined by sorting the multiple nodes by connectedness. For example, layout unit 233 may order nodes with equal rank assignments by first taking nodes from left connected components, ordered by increasing connectedness, followed by the backbone node for the rank, followed by nodes from right connected components, ordered by decreasing connectedness, or similar. The relative order of nodes with the same connectedness may be chosen to minimize crossings between edges to a previous or next rank, e.g., layout unit 233 may sort paths according to connectedness and order nodes according to the first path selected by ranking unit 231 that they appeared along.

In some embodiments, layout unit 233 determines orderings of nodes of a global graph with equal rank assignments by determining a backbone node for each rank, determining a side of a connected subgraph of the global graph, the connected subgraph not comprising backbone nodes, the side being a left side or a right side, and assigning an order to a subgraph node of the connected subgraph that is smaller than the order of the backbone node for the rank assigned to the subgraph node if the side is a left side and larger than the order of the backbone node for the rank assigned to the subgraph node if the side is a right side.

Having determined the orderings of nodes of the global graph, these orderings may be used to determine the orderings of nodes of the graph with equal rank assignment. For instance, the nodes of the graph with equal rank assignment may be ordered as they appear in the orderings of nodes of the global graph, e.g., the orderings of the nodes of the graph are obtained by filtering out those nodes from the orderings of nodes of the global graph that do not appear in the graph. This has the advantage that stability between graph layouts is increased, since consistent orders of nodes are used, and that the efficiency of ordering nodes increases, since the orderings of nodes of the global graph can be re-used for determining layouts of multiple graphs.

The increased stability may be observed, for example, by comparing FIGS. 5a and 5b showing graphs rendered according to layouts by the known tool "dot" to FIGS. 6 and 7 showing the respective graphs rendered according to layouts according to an embodiment, as discussed above. Graph layouts 500 and 510 obtained by "dot" both comprise a node labelled "Checked and approved", 504, 514 and a node labelled "Request data", 505, 515. In layout 500, the first node 504 is to the left of the second node 505 whereas in layout 510 the first node 514 is to the right of the second node 515. FIGS. 6 and 7 show the same graphs layout according to an embodiment, 600, 700; in particular, both layouts 600, 700 comprise a node labelled "Checked and approved", 604, 704 and a node labelled "Request data", 605, 705. In both layouts 600, 700, the first node 604, 704 is located to the left of the second node, 605, 705 as a consequence of the fact that the same ordering of nodes of the global graph is used to determine the orderings of nodes 604, 605 in graph 600 and nodes 704, 705 in graph 700. Hence, advantageously, the stability of the layout with respect to these particular nodes is increased in layouts 600, 700 compared to layouts 500, 510.

Moreover, obtained layouts may advantageously more closely match the underlying data since the backbone appears central in the graph layouts. This can also be observed by comparing FIGS. 5a and 5b to FIGS. 6 and 7. In each of the figures, the same path comprising the five nodes "Request invoice", "Check received invoice", "Final check of invoice", "Approve invoice", and "Pay invoice" is shown with thick edges and dark-colored nodes. In this case, this particular path is a path from the global set of paths, namely, the path with the highest weight. As a consequence of the use by graph layout device 210 of the ranking and ordering mechanisms described herein, the nodes of the path appear top-to-bottom in layouts 600, 700; moreover, these nodes become backbone nodes and as such appear central in the layouts 600, 700, reflecting the importance of this path. In contrast, in layouts 500 and 600 that do not use the graph layout techniques described herein, the path does not appear to-to-bottom, nor do the nodes appear central among nodes of their rank. Hence, layouts 600, 700 more closely match the underlying data, in particular, its sequential nature as reflected in the set of paths.

Returning to FIG. 2, having determined orderings of nodes of the graph based on the orderings of nodes of the global graph, these orderings may optionally be further refined, e.g., by applying one or more cross reduction steps known from the literature to further reduce crossings and/or obtain a graph layout that is more tailored to the current graph.

In some embodiments, graph layout device 210 is further configured to determine a layout of a further graph. The further graph is induced by a further set of paths through the set of nodes. The further set of paths is a subset of global set of paths 241. The layout 244 of the graph and the layout of the further graph are computed based on the same global rank assignment, e.g., ranking unit 231 computes global rank assignment 242 and unit 233 computes both the layout of the graph and the layout of the further graph based on global rank assignment 242, for example, using techniques discussed above. Advantageously, global rank assignment 242 is used to compute both the layout of the graph and the layout of the further graph, eliminating the need to compute the rank assignment twice and thus improving performance as well as improving the consistency between the rank assignments used for the two graphs. In some embodiments, orderings of nodes of the graph with equal rank assignments are computed from orderings of nodes of a global graph induced by global set of paths 241. In this case, layout unit 233 may determine the orderings of nodes of the global graph once and use them both to compute the layout of the graph 244 and the layout of the further graph, similarly improving performance and consistency between the graphs.

Graph layout device 210 optionally comprises a rendering unit 234 and a display 220. Rendering unit 234 is configured to render on display 220 the graph according to layout of the graph 244. Rendering the graph comprises displaying the nodes of the graph on the positions specified by layout 244 and drawing the edges between the nodes. Drawing the edges may be performed with various spline drawing techniques known from the literature. In some embodiments, e.g., as discussed above, layout unit 233 is configured to compute positions of dummy nodes inserted between nodes whose ranks differ by more than one. An edge between such nodes may be drawn passing through the computed positions of dummy nodes inserted between them, e.g., the dummy nodes lay out a path for a spline, and an edge between the nodes may be drawn as a spline through the nodes and the dummy nodes inserted between them. Rendering unit 234 may search the smoothest curve between two points such that other nodes, edges, and labels are avoided. This may comprise first computing a polygonal region in which a spline may be drawn, and then, given this polygonal region, computing a spline within this region. Computing the region may take already drawn splines, nodes and labels into account, reducing the number of accidental edge-edge, edge-node or edge-label crossings. In particular, the algorithm proposed in Gansner et al., "A Technique for Drawing Directed Graphs", IEEE Trans. Software Eng. 19.3 (1993) (included herein by reference) or variants thereof may be applied.

In embodiments where graph layout device 210 is further configured to determine a layout of a further graph, as discussed above, rendering unit 234 may render on display 220 an animation morphing a rendering of the graph into a rendering of the further graph. Advantageously, since the layout of graph and the layout of the further graph are both based on rank assignment 242 and possibly on orderings of nodes of a global graph, nodes occurring in both graphs typically have similar positions in the two graph layouts and similar orientations with respect to each other, facilitating the morphing process. For example, due to the similar orientations, it may be avoided that nodes swap orientation with respect to each other, e.g., that a first node is to the left of a second node in the graph and to the right of the second node in the further graph, thereby giving an improved morphing effect. Various morphing techniques may be used. For example, a rendering of the first graph may be shown on which a rendering of the second graph is superimposed with increased opacity. Or, subsequent renderings may be shown in which the positions of nodes occurring in both graphs are interpolated between their positions in the first layout and in the second layout. Nodes occurring only in the first graph may be shown with decreasing opacity and/or disappear whenever they overlap with another node. Similarly, nodes occurring only in the second graph may be shown with increasing opacity and/or appear whenever their position does not overlap with that of another node. Edges may be drawn with respect to the intermediate positions in the animation, for example, using the techniques discussed above.

An additional example highlighting some of the advantages of using a global rank assignment is shown in FIG. 4*a* and FIG. 4*b*. FIG. 4*a* schematically shows an example of a global set of paths 441 comprising paths "CA", 456, "AB", 457, and "AC", 458 through nodes "A", 451, "B", 452 and "C", 453. FIG. 4*b* schematically shows examples of sets of paths 444, 444' that are subsets of global set of paths 441. Set of paths 444 comprises path "CA", 456 and path "AB", 457. Set of paths 444' comprises paths "AB", 457 and "AC", 458.

FIG. 4*a* schematically shows examples of layouts 443 and 443' of graphs induced by sets of paths 444 and 444', respectively, according to global rank assignment 442. Computing a global rank assignment according to embodiments described herein may result in global rank assignment 442, in which rank 2 is assigned to node "A", 451, rank 3 is assigned to node "B", 452, and rank 1 is assigned to node "C", 453. For example, ranking unit 231 may select path "CA" and update the global rank assignment to be C: 1, A: 2; select path "AB" and update the global rank assignment to be C: 1, A: 2, B: 3; and finally select path "AC" and keep the global rank assignment unchanged. The y-coordinates of nodes "A", 451, "B", 452 and "C", 453 in layouts 443 and 443' are determined by global rank assignment 442 and hence are the same in layouts 443 and 443'. Advantageously, this leads to two similar graph layouts, e.g., the graph layout remains stable across graphs induced by different subsets 444, 444' of global set of paths 441.

FIG. 4*b* schematically shows examples of layouts 446, 446' of graphs induced by sets of paths 444 and 444', respectively, that may be obtained by using local rank assignments 445, 445' instead of a global rank assignment. For example, local rank assignment 445 for set of paths 444 may be A: 2, B: 3, C: 1, for example, A is assigned a higher rank than C because A occurs after C in a path and B is assigned a higher rank than A because B occurs after A in a path. Similarly, local rank assignment 445' for set of paths 444' may be A: 1, B: 2, C: 2, for example, B and C are assigned a higher rank than A because they occur after A in a path. As a consequence, the y-coordinates of node "A", 451, "B", 452, and "C", 453, are not the same in resulting layouts 446, 446' because they are based on different rank assignments. In particular, when computing local rank assignment 445', there is no indication that C should be assigned a lower ranking than A, e.g., to increase stability across layouts of different graphs based on the same global set of paths, because only local information is used in the graph layout. In contrast, global rank assignment 442 is based on global set of paths 441 and hence it is assured that a consistent rank assignment is used for layouts 443 and 443', thereby increasing stability and ensuring that graph layouts 443, 443' better reflect underlying global set of paths 441.

Graph layout device 110, 111, or 210 may have a user interface, which may include well-known elements such as one or more buttons, a keyboard, display, touch screen, etc. The user interface may be arranged for accommodating user interaction for determining a graph layout, e.g., by filtering the global set of paths.

Typically, graph layout device 110, 111, or 210 comprises a microprocessor (not separately shown) which executes appropriate software stored at the device 110, 111, or 210; for example, that software may have been downloaded and/or stored in a corresponding memory, e.g., a volatile memory such as RAM or a non-volatile memory such as Flash (not separately shown). Alternatively, the graph layout devices 110, 111, or 210 may, in whole or in part, be implemented in programmable logic, e.g., as field-programmable gate array (FPGA). Graph layout device 110 or 210 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, graph layout device 110 or 111 comprises a memory circuit and a processor circuit. Device 110 or 111 may comprise additional circuits, e.g., a communication circuit or a storage circuit. The graph layout device may comprise one or more of a ranking circuit, a filtering circuit, a layout circuit, and a rendering circuit. The circuits implement the corresponding units described herein. The circuits may be a processor circuit and storage circuit, the processor circuit executing instructions represented electronically in the storage circuits. The circuits may also be, FPGA, ASIC or the like.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the memory may have volatile and a non-volatile part. Part of the memory may be read-only.

Figure 8:
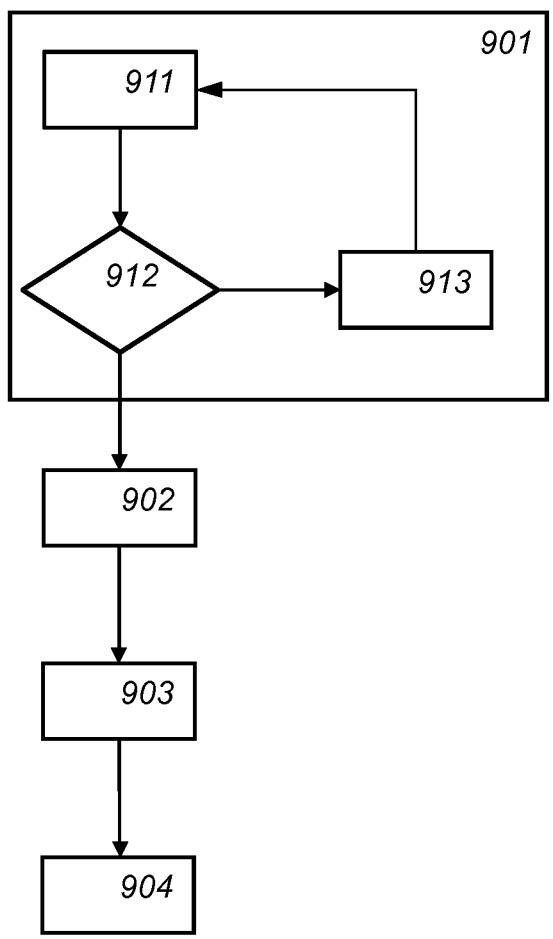

FIG. 8 schematically shows an example of an embodiment of a graph layout method 900. Graph layout method 900 is configured for determining a layout of a graph. For example, graph layout method 900 may be executed on a graph layout device. The graph is induced by a set of paths through a set of nodes. The nodes of the graph are comprised in the set of nodes. The set of paths is a subset of a global set of paths through the set of nodes. The layout comprises a position of each node of the graph. Graph layout method 900 comprises:

computing 901 a global rank assignment assigning a rank to each node in the set of nodes, computing the global rank assignment comprising iteratively selecting 911 a path from the global set of paths and updating 913 the global rank assignment based on the selected path, optionally checking 912 whether the global rank assignment is complete filtering 902 the global set of paths to obtain the set of paths, computing 903 the layout of the graph based on the global rank assignment, wherein nodes of the graph with equal rank assignments are positioned adjacent to each other, storing 904 the layout of the graph in a memory.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 901 and 902 may be executed, at least partially, in parallel. Moreover, a given step may not have finished completely before a next step is started.

A method according to the invention may be executed using software, which comprises instructions for causing a processor system to perform method 900. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 9A:
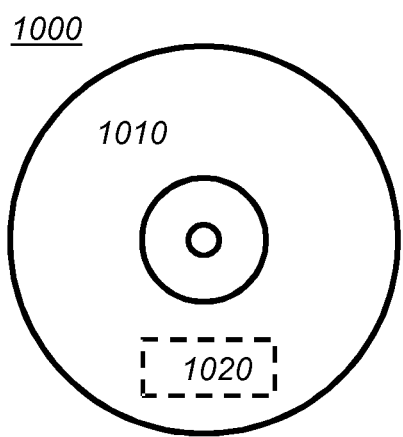

FIG. 9a shows a computer readable medium 1000 having a writable part 1010 comprising a computer program 1020, the computer program 1020 comprising instructions for causing a processor system to perform a graph layout method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said graph layout method.

Figure 9B:
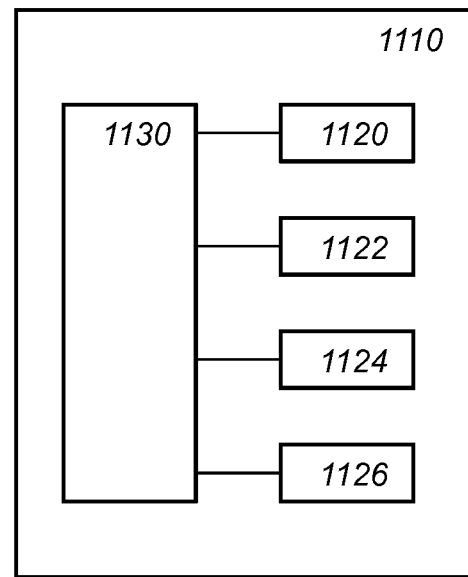

FIG. 9b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the graph layout device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A graph layout device for determining a layout of a graph, the graph being induced by a set of paths through a set of nodes, the nodes of the graph being comprised in the set of nodes, the set of paths being a subset of a global set of paths through the set of nodes, the layout comprising a position of each node of the graph, the graph layout device comprising:
  a memory configured to store the graph; and
  a processor configured to:
    compute a global rank assignment assigning a rank to each node in the set of nodes, computing the global rank assignment comprising:
      sorting the global set of paths by a weight corresponding to each path of the global set of paths, and
      iteratively 1) selecting a path through a plurality of nodes from the sorted global set of paths based on an order of the sorted global set of paths and 2) updating the global rank assignment for each of the plurality of nodes of the selected path;
    filter the global set of paths to obtain the set of paths;
    compute the layout of the graph based on the global rank assignment, wherein nodes of the graph with equal rank assignments are positioned adjacent to each other; and
    store the layout of the graph in the memory.

2. The graph layout device of claim 1, wherein the graph layout device is further configured to determine a layout of a further graph, the further graph being induced by a further set of paths through the set of nodes, the further set of paths being a subset of the global set of paths, the layout of the graph and the layout of the further graph being computed based on the same global rank assignment.

3. The graph layout device of claim 1, wherein the graph layout device further comprises a display, the processor being further configured to render on the display the graph according to the layout of the graph.

4. The graph layout device of claim 2, wherein the graph layout device further comprises a display, the graph layout device being further configured to render on the display an animation morphing a rendering of the graph into a rendering of the further graph.

5. The graph layout device of claim 1, wherein computing the layout of the graph comprises:
  determining a set of nodes with equal rank assignments;
  determining an ordering of said set of nodes; and
  assigning a position to a node in said set of nodes according to the global rank assignment and said ordering.

6. The graph layout device of claim 5, wherein determining the ordering of the set of nodes with equal rank assignments comprises:
  determining an ordering of a set of nodes of a global graph with equal rank assignments; and
  computing the ordering of the set of nodes with equal rank assignments from the ordering of the set of nodes of the global graph with equal rank assignments, the set of nodes with equal rank assignments being a subset of the set of nodes of the global graph with equal rank assignments and the global graph being induced by the global set of paths.

7. The graph layout device of claim 6, wherein determining the orderings of the set of nodes of the global graph with equal rank assignments comprises:
  determining a backbone node for each rank wherein backbone nodes for subsequent ranks being connected by edges of the global graph;
  dividing non-backbone nodes of the graph into connected components; and
  ordering all nodes of a connected component before or after said backbone nodes for their respective rank.

8. The graph layout device of claim 1, wherein nodes of the graph are comprised in a union of nodes along paths from the set of paths, edges of the graph being comprised in a union of edges along paths from the set of paths.

9. The graph layout device of claim 1, wherein the weight corresponding to each path of the global set of paths represents a number of occurrences of the path.

10. The graph layout device of claim 1, wherein the weight corresponding to each path of the global set of paths is specified by a user.

11. The graph layout device of claim 10, wherein, if a node along the selected path precedes or follows all other nodes along the selected path to which a rank is assigned, the global rank assignment is updated wherein a rank is assigned to the node that is smaller or larger than the ranks of said all other nodes.

12. The graph layout device of claim 1, wherein updating the global rank assignment comprises updating the global rank assignment wherein distinct ranks are assigned to nodes along the selected path.

13. The graph layout device of claim 12, wherein, if a first node occurs between a second node and a third node along the selected path, wherein no rank is assigned to the first node and ranks are assigned to the second node and the third node, the global rank assignment is updated wherein a rank is assigned to the first node that is in between the rank assigned to the second node and the rank assigned to the third node.

14. The graph layout device of claim 1, wherein nodes represent activities and paths represent temporal sequences of activities.

15. A graph layout method for determining a layout of a graph, the graph being induced by a set of paths through a set of nodes, the nodes of the graph being comprised in the set of nodes, the set of paths being a subset of a global set of paths through the set of nodes, the layout comprising a position of each node of the graph, the graph layout method comprising:
  computing a global rank assignment assigning a rank to each node in the set of nodes, computing the global rank assignment comprising:
    sorting the global set of paths by a weight corresponding to each path of the global set of paths, and
    iteratively 1) selecting a path through a plurality of nodes from the sorted global set of paths based on an order of the sorted global set of paths paths and 2) updating the global rank assignment for each of the plurality of nodes of the selected path;
  filtering the global set of paths to obtain the set of paths;
  computing the layout of the graph based on the global rank assignment, wherein nodes of the graph with equal rank assignments are positioned adjacent to each other; and
  storing the layout of the graph in a memory.

16. A non-transitory computer readable medium storing computer program instructions for determining a layout of a graph, the graph being induced by a set of paths through a set of nodes, the nodes of the graph being comprised in the set of nodes, the set of paths being a subset of a global set of paths through the set of nodes, the layout comprising a position of each node of the graph, the computer program instructions when executed by a processor cause the processor to perform operations comprising:

computing a global rank assignment assigning a rank to each node in the set of nodes, computing the global rank assignment comprising iteratively:
  sorting the global set of paths by a weight corresponding to each path of the global set of paths, and
  iteratively 1) selecting a path through a plurality of nodes from the sorted global set of paths based on an order of the sorted global set of paths and 2) updating the global rank assignment for each of the plurality of nodes of the selected path;
filtering the global set of paths to obtain the set of paths;
computing the layout of the graph based on the global rank assignment, wherein nodes of the graph with equal rank assignments are positioned adjacent to each other; and
storing the layout of the graph in a memory.

* * * * *

UNITED STATES PATENT AND TRADEMARK OFFICE
CERTIFICATE OF CORRECTION

PATENT NO. : 12,013,896 B2
APPLICATION NO. : 17/254705
DATED : June 18, 2024
INVENTOR(S) : Roeland Augustinus Maria Vliegen Page 1 of 1

It is certified that error appears in the above-identified patent and that said Letters Patent is hereby corrected as shown below:

In the Claims

Column 24, Claim 15, Line 50:
order of the sorted global set of paths paths and 2)

Should read:
--order of the sorted global set of paths and 2)--

Column 25, Claim 16, Line 3:
rank assignment comprising iteratively:

Should read:
--rank assignment comprising:--

Signed and Sealed this
Thirteenth Day of August, 2024

Katherine Kelly Vidal
*Director of the United States Patent and Trademark Office*